June 19, 1934.   C. G. WOOD   1,963,188

CLUTCH PLATE

Filed Oct. 23, 1931

INVENTOR.
Clarence G. Wood
BY
Fay, Oberlin & Fay
ATTORNEYS.

UNITED STATES PATENT OFFICE 1,963,188

CLUTCH PLATE

Clarence G. Wood, Cleveland, Ohio

Application October 23, 1931, Serial No. 570,558

2 Claims. (Cl. 192—68)

The present invention, relating as indicated to clutch plates, is more particularly directed to a new and improved drive plate for use in a clutch of the general type employed in motor driven vehicles, for example, and a principal object of the invention is the provision of simple and inexpensive means for absorbing minor variations in the torque transmitted through the drive plate.

To the accomplishment of the foregoing and related ends, said invention, then, consists of the means hereinafter fully described and particularly pointed out in the claims; the annexed drawing and the following description setting forth in detail one product exemplifying my invention, such disclosed product constituting, however, but one of various applications of the principle of my invention.

Figure 1:
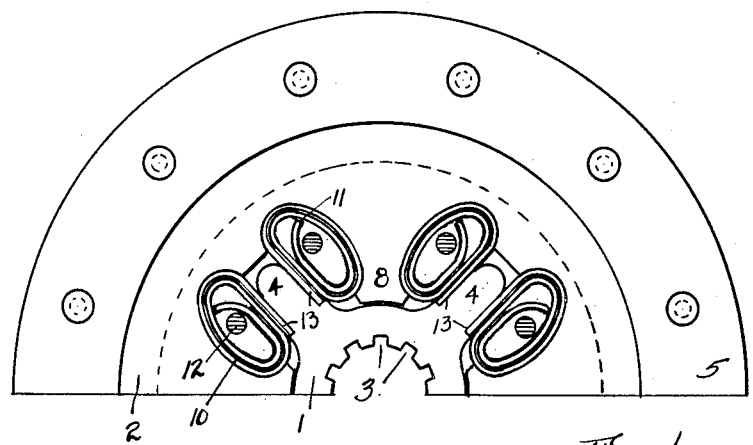
Figure 2:
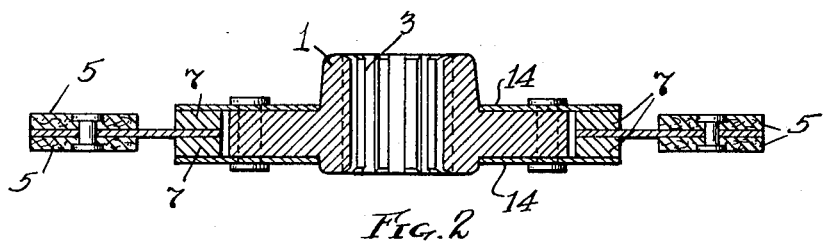
Figure 3:
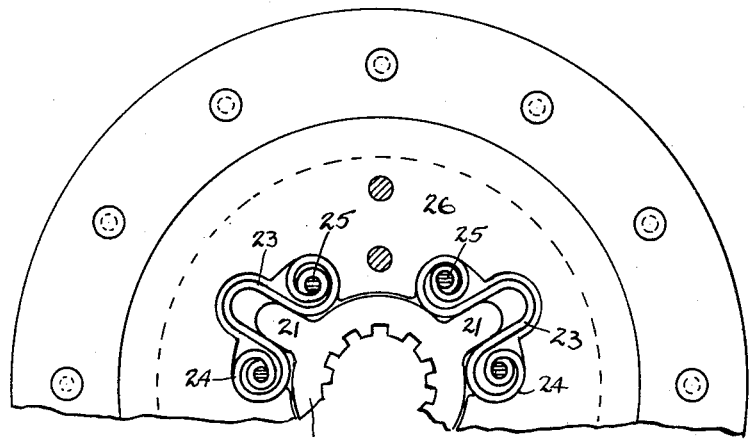

In said annexed drawing:

Fig. 1 is a front elevation of my improved clutch plate; Fig. 2 is a central transverse section through the same; and Fig. 3 is a view similar to Fig. 1, but showing a modification of construction there shown.

Referring now to Figs. 1 and 2 I have shown a driven element 1 and driving element 2 of my improved clutch plate, the driven element being in the form of a hub having a plurality of keyways 3 adapting it to engage upon, and drive, a suitably formed shaft. The hub portion 1 is provided with a plurality of radially extending equidistantly spaced driving lugs 4.

The driving member 2 is provided with friction facings 5 on either side of its radially outer portion and reinforcing plates 7 secured to its radially inner portions, and provided with driving lugs 8 equidistantly spaced and extending into the spaces between the lugs 4 on the hub 1.

The drive is transmitted from the driving to the driven member by means of a plurality of coil springs 10 mounted on either side of each of the driven elements 4 and engaging against the corresponding driving faces of the driving lugs 8. The springs 10 have their inner convolutions and ends 11 surrounding the rivets or lugs 12 disposed on the driving member and their outer ends 13 engaged against the opposite faces of the driven lugs 4. The rivets 12 also serve to retain the pair of annular cover plates 14, 14 on the body of the plate; the cover plates 14, 14 in turn serve as a means for enclosing the coil springs and to maintain the latter in alignment as well as to prevent the ingress of dirt, grease, and dust.

Rotation of the driving member compresses circumferentially and, to an extent, coils each of the springs 10, which action is of course resisted by the springs and the pressure exerted against the springs is transmitted to the driven elements or members 4 of the driven member 1. In this way a torque absorbing driving connection between driving and driven members is secured and one which absorbs minor irregularities and shocks in the driving member, and imparts a substantially smooth and steady driving pressure in the driven member.

In Fig. 3 the driven member 20 is provided with lugs 21 engaged by the central U-portion 23 of a bow-spring 24, the ends of which are coiled, as shown, and are mounted on rivets 25 disposed in the driving element 26. The driving action is transmitted through the springs 24 to the lugs 21 on the driven hub member. The circumferential displacement of the central portion of these springs tends to uncoil one of the terminal loops of each spring and to coil the other. The driving action is thus resisted by the entire length of each spring, and this resistance causes a torque absorbing and even transmission of the driving action from the driving member 26 to the driven member 20. When torque is transmitted from the clutch plate 26 to the hub 20, there will be a tendency for one of the rivets 25 to move closer to the radial lugs 21 and for the other of the pair of rivets 25 to move away from the lugs. The interposition of the U-shaped spring having the coiled ends between the rivets 25 and lugs 21 serves to increasingly resist such movement by reason of the fact that the medial portion of the spring 23 will be subjected to a bending action and both of the coils will be subjected to a winding or unwinding action as the case may be. Therefore, there is presented a dampening function, cumulative in nature, which is the resultant of both a bending and coiling resistance of the U-shaped springs.

My improved clutch provides a simple and economical means for transmitting a driving action from a driving to a driven member with a minimum of irregularity and shock in the transmission of power between the two elements.

Other modes of applying the principle of my invention may be employed instead of the one explained, change being made as regards the means herein disclosed, provided the means stated by any of the following claims or the equivalent of such stated means be employed.

I therefore particularly point out and distinctly claim as my invention:—

1. In a clutch plate, the combination of a disc carrying friction facing rings, a hub member positioned centrally and movably with respect to said disc, radially extending arms on said hub member, an annular reinforcing member secured to said disc and having a plurality of projections extending between said radially extending arms, cover plates extending over said reinforcing member and said projections, fasteners for securing together said cover plates and spring means having their ends mounted on said fasteners, said spring means engaging the lateral faces of said radially extending arms.

2. In a clutch plate, the combination of a disc carrying friction facing rings, a hub member positioned centrally and movably with respect to said disc, radially extending arms on said hub member, projections on said disc extending between said radial arms, and U-shaped flat springs having coiled ends, said ends being secured to said disc and the inner sides of the U engaging against said radial arms.

CLARENCE G. WOOD.